(12) United States Patent
Odate et al.

(10) Patent No.: US 7,898,402 B2
(45) Date of Patent: Mar. 1, 2011

(54) VEHICLE OCCUPANT DETECTION APPARATUS

(75) Inventors: Shotaro Odate, Wako (JP); Yoshitaka Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 11/866,654

(22) Filed: Oct. 3, 2007

(65) Prior Publication Data

US 2008/0094195 A1    Apr. 24, 2008

(30) Foreign Application Priority Data

Oct. 24, 2006    (JP) ................................. 2006-289116

(51) Int. Cl.
*B60Q 1/00* (2006.01)
(52) U.S. Cl. .................. 340/438; 348/143; 348/148
(58) Field of Classification Search .................. 340/426,
340/425.5, 427, 428, 825.34, 825.36, 457;
348/143, 148, 151–156, 159
See application file for complete search history.

(56) References Cited

U.S. PATENT DOCUMENTS

| | | | | | |
|---|---|---|---|---|---|
| 5,557,254 | A | * | 9/1996 | Johnson et al. | 340/426.19 |
| 5,801,763 | A | * | 9/1998 | Suzuki | 348/77 |
| 5,812,067 | A | * | 9/1998 | Bergholz et al. | 340/5.52 |
| 6,082,858 | A | * | 7/2000 | Grace et al. | 351/200 |
| 6,507,779 | B2 | * | 1/2003 | Breed et al. | 701/45 |
| 6,714,665 | B1 | * | 3/2004 | Hanna et al. | 382/117 |
| 7,308,581 | B1 | * | 12/2007 | Geosimonian | 713/186 |
| 7,315,233 | B2 | * | 1/2008 | Yuhara | 340/5.72 |
| 7,619,650 | B2 | * | 11/2009 | Bothe et al. | 348/187 |
| 2004/0085448 | A1 | * | 5/2004 | Goto et al. | 348/148 |
| 2005/0111700 | A1 | * | 5/2005 | O'Boyle et al. | 382/104 |

FOREIGN PATENT DOCUMENTS

| JP | 01-280267 | 10/1989 |
|---|---|---|
| JP | 2003-127824 | 5/2003 |
| JP | 2003-127824 | 5/2003 |

* cited by examiner

*Primary Examiner* — George A Bugg
*Assistant Examiner* — Edny Labbees
(74) *Attorney, Agent, or Firm* — Rankin, Hill & Clark LLP

(57) ABSTRACT

A vehicle occupant detection apparatus includes an image pickup device for imaging an area including a position of a vehicle occupant within a vehicle compartment, a light emitting element for emitting auxiliary light into the compartment that includes the imaging area of the pickup device, and a storage section for storing imaging information provided by the pickup device. The vehicle occupant detection apparatus further including a comparison section for comparing imaging information provided through further imaging by the pickup device and the imaging information stored in the storage section, to provide a difference between the imaging information provided through the further imaging and the stored imaging information, and an abnormality determination section for determining abnormality of the imaging information on the basis of the image information difference.

6 Claims, 3 Drawing Sheets

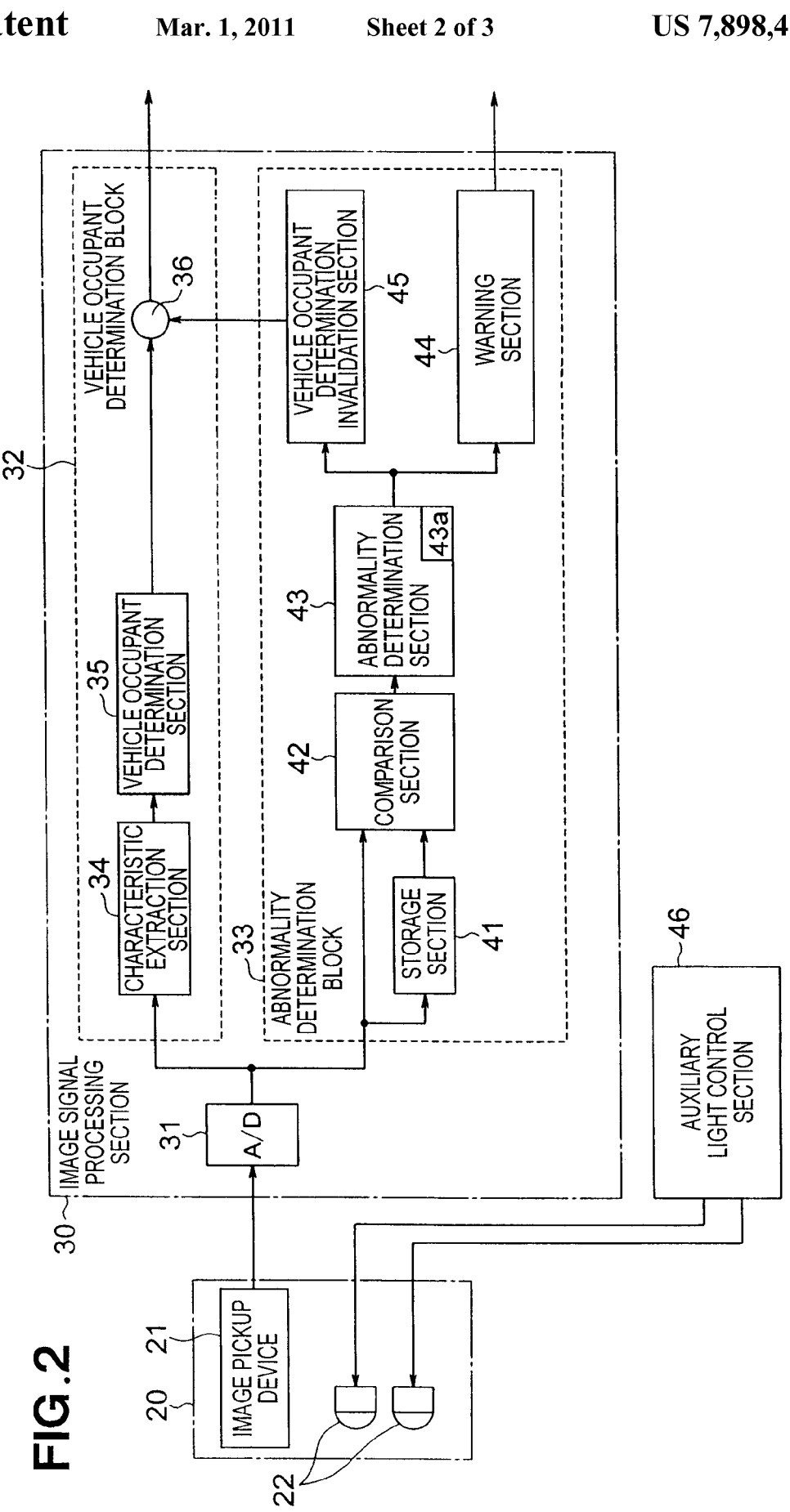

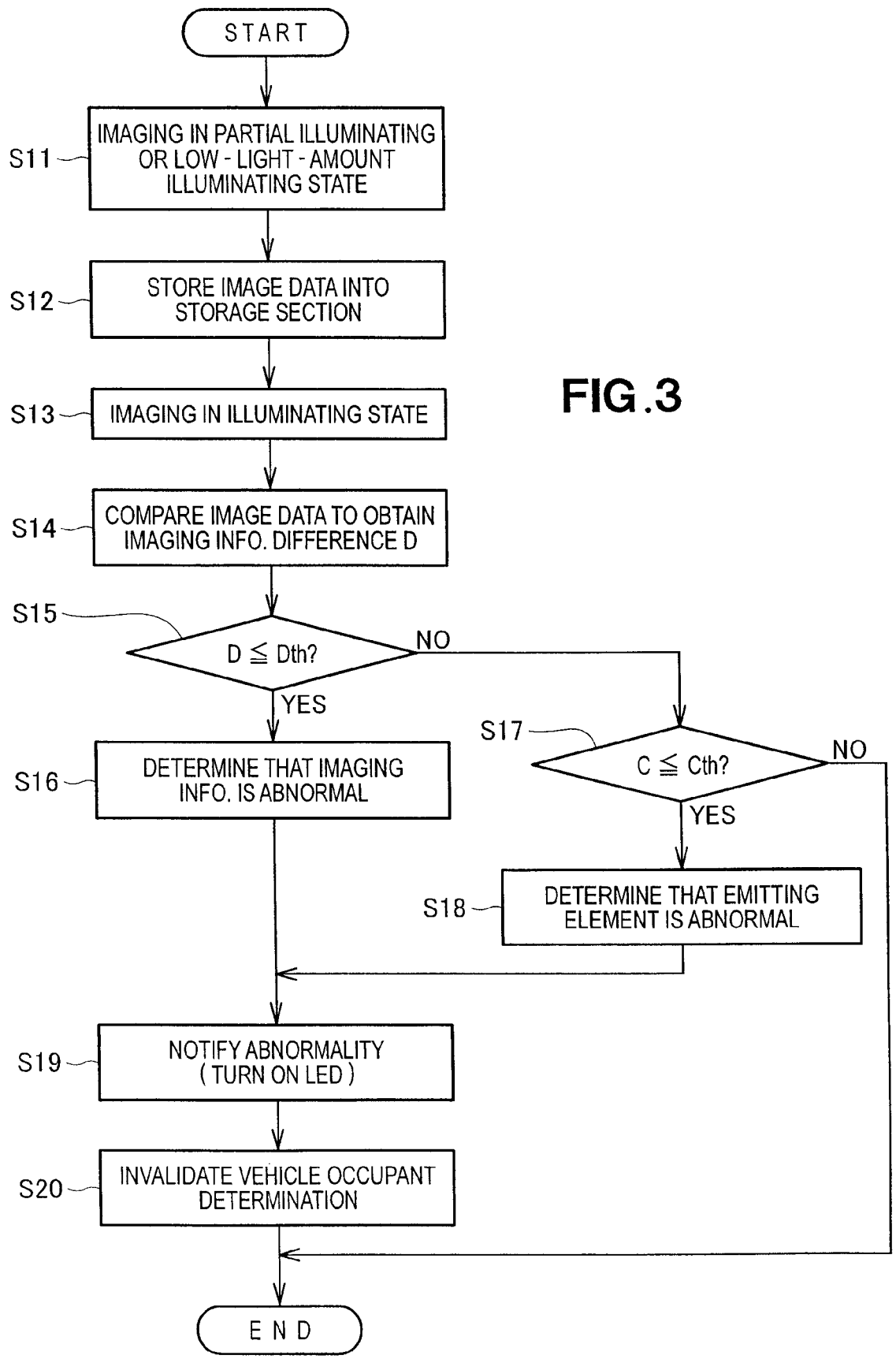

VEHICLE OCCUPANT DETECTION APPARATUS

FIELD OF THE INVENTION

The present invention relates generally to vehicle occupant detection apparatus, and more particularly to an improved vehicle occupant detection apparatus which acquires images of a vehicle occupant via an image pickup device and forestalls a functional failure of the apparatus by monitoring an operating state of the image pickup device.

BACKGROUND OF THE INVENTION

The vehicle occupant detection apparatus are apparatus designed to detect a vehicle occupant, such as a driver, present within a vehicle compartment. In these vehicle occupant detection apparatus, an image pickup device, such as a CMOS camera, is installed, for example, on or near a rearview mirror provided on a front upper edge portion of the vehicle compartment, to detect and monitor a vehicle occupant. Today, such vehicle occupant detection apparatus are used to activate a vehicle occupant protection apparatus installed on a vehicle seat in order to protect a vehicle occupant. These vehicle occupant detection apparatus detect a seated condition of the vehicle occupant, posture of the vehicle occupant in the seat, etc. using the image pickup device.

Among the conventionally-known techniques concerning vehicle occupant detection apparatus are a vehicle occupant protection apparatus disclosed in Japanese Patent Application Laid-open Publication No. 2003-127824. The disclosed vehicle occupant protection apparatus pertains to an airbag apparatus mounted on a vehicle in such a manner that the air bag apparatus is deployed, upon collision of the vehicle against an external object, to protect the vehicle occupant. The airbag apparatus is equipped with an area image sensor device that takes images of a seat, taken by a vehicle occupant, from a substantial front of the seat. The area image sensor device includes a pair of left and right area image sensors (image pickup devices) provided in front of the seat in horizontally spaced-apart relation to each other. Information about positions, in a vehicle's front-rear direction, of various parts of the vehicle occupant etc. is obtained on the basis of image information of the vehicle occupant acquired by imaging operation of the area image sensor device, on the basis of which control is performed on the deployment of the airbag at the time of collision of the vehicle with an external object is performed. With the vehicle occupant protection apparatus disclosed in the No. 2003-127824 publication, a stereoscopic-vision-type vehicle occupant distance measurement can be advantageously improved to allow a position, in the vehicle's front-rear direction, of the head of the vehicle occupant, among other vehicle occupant's parts, to be detected reliably and in a short time.

The conventionally-known vehicle occupant detection apparatus do not present any problem when the image pickup device used is operating normally. However, once abnormal operation occurs in the image pickup device, the acquired image information tends to become less reliable, which would result in a degraded reliability of the operational performance of the apparatus themselves. Thus, there has been a great need for a capability to distinguish in advance between normal and abnormal imaging operation of the image pickup device and thereby forestall a functional failure of the detection apparatus.

SUMMARY OF THE INVENTION

In view of the foregoing prior art problems, it is an object of the present invention to provide an improved vehicle occupant detection apparatus which can distinguish between normal and abnormal imaging operation of an image pickup device and thereby forestall a functional failure of the apparatus.

In order to accomplish the above-mentioned object, the present invention provides an improved vehicle occupant detection apparatus, which comprises: an image pickup device for imaging an area that includes a position of a vehicle occupant within a vehicle compartment; a vehicle occupant determination section for making a determination about the vehicle occupant; a light emitting element for emitting auxiliary light into the vehicle compartment that includes the imaging area of the image pickup device; a storage section for storing imaging information provided by the image pickup device; a comparison section for comparing imaging information provided through further imaging operation by the image pickup device and the imaging information stored in the storage section, to provide a difference between the imaging information provided through the further imaging operation and the stored imaging information; and an imaging abnormality determination section for determining abnormality of the imaging information on the basis of the difference provided by the comparison section.

In imaging the vehicle occupant (i.e., object to be imaged), the vehicle occupant detection apparatus of the present invention images the vehicle occupant twice with the light emitting state of the light emitting element varied, so that it is possible to determine, on the basis of a difference between the imaging information acquired through the two imaging operations, normality or abnormality of the imaging information. With this arrangement, the present invention can forestall any functional failure of the vehicle occupant detection apparatus.

Preferably, the vehicle occupant detection apparatus comprises a plurality of the light emitting elements, and the comparison section compares the imaging information provided by the image pickup device with the light emitting element set (i.e., operating) in a partial illuminating state and the imaging information provided by the image pickup device with the light emitting element set (i.e., operating) in a full illuminating state. In this case, the vehicle occupant is imaged twice with the auxiliary light emitting state of the light emitting element varied between the partial illuminating state and the full illuminating state, so that the difference between the imaging information acquired through the two imaging operations can be extracted accurately.

Preferably, the comparison section compares the imaging information provided by the image pickup device with at least one light emitting element set in a low-light-amount illuminating state and the imaging information provided by the image pickup device with at least one light emitting element set in an illuminating state with a predetermined light amount greater than the low light amount. In this case, the vehicle occupant is imaged twice with the auxiliary light emitting state of the light emitting element varied between the low-light-amount illuminating state and the illuminating state using the predetermined light amount greater than the low light amount, so that the difference between the imaging information acquired through the two imaging operations can be extracted accurately.

Preferably, the vehicle occupant detection apparatus of the present invention further comprises a light-emitting-element abnormality determination section for determining abnormality of the light emitting element on the basis of luminance information in the imaging information provided by the image pickup device with the light emitting element set in a predetermined illuminating state. In this case, normality or abnormality of the light emitting element itself can be determined using the luminance information included in the imaging information.

Preferably, the vehicle occupant detection apparatus further comprises an abnormality notifying section for notifying abnormality of the imaging information on the basis of a determination signal output by the abnormality determination section. With such an arrangement, the present invention can forestall any functional failure of the vehicle occupant detection apparatus.

Preferably, the vehicle occupant detection apparatus of the preset invention further comprises an invalidation section for invalidating the determination about the vehicle occupant made by the vehicle occupant determination section when the imaging abnormality determination section has determined that the imaging information is abnormal.

As set forth above, the vehicle occupant detection apparatus of the present invention images the vehicle occupant twice with the light emitting state of the light emitting element varied, and normality or abnormality of the imaging information is determined on the basis of a difference between the imaging information acquired through the two imaging operations. With this arrangement, whether the light emitting element is normal or abnormal can be determined reliably, with the result that the present invention can forestall and notify in advance any functional failure of the vehicle occupant detection apparatus.

BRIEF DESCRIPTION OF THE DRAWINGS

Certain preferred embodiments of the present invention will hereinafter be described in detail, by way of example only, with reference to the accompanying drawings, in which:

FIG. 2 is a block diagram showing an example system setup of the vehicle occupant detection apparatus shown in FIG. 1; and FIG. 3 is a flow chart showing an example sequence of operations performed by the vehicle occupant detection apparatus shown in FIG. 1.

DETAILED DESCRIPTION OF THE PREFERRED EMBODIMENTS

Figure 1:
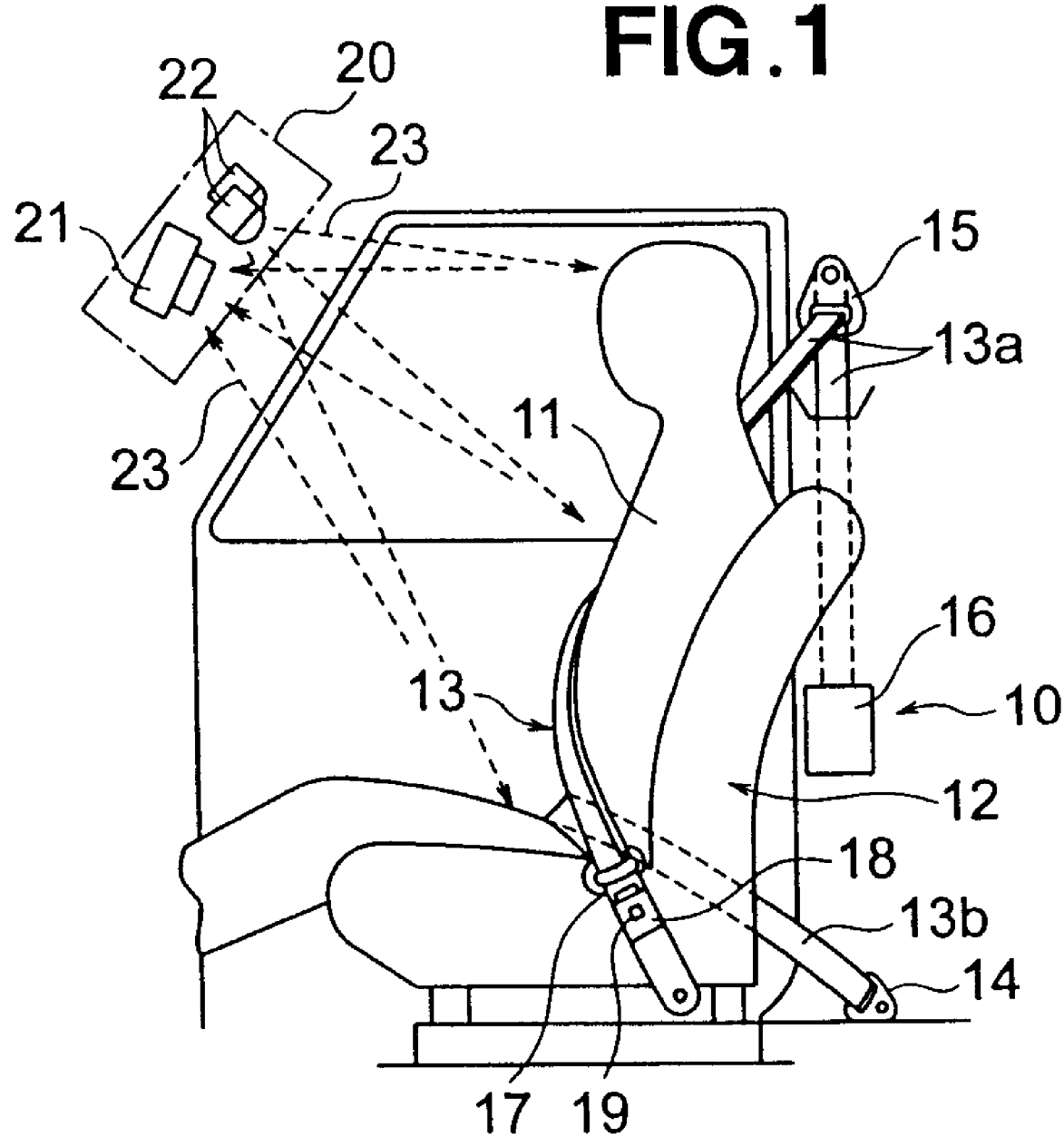
FIG. 1 is a side view showing an embodiment of a vehicle occupant detection apparatus provided with respect to a vehicle occupant seated in a driver seat of a vehicle.

Now, with reference to FIGS. 1-3, a description will be given about a vehicle occupant detection apparatus in accordance with an embodiment of the present invention. For example, this vehicle occupant detection apparatus of the present invention will be described as constructed to take images of a vehicle occupant (driver) 11 seated in a driver seat 12. However, it should be noted that the same structural arrangements are provided for detection of another vehicle occupant seated in another seat of the vehicle.

FIG. 1 is a side view showing the embodiment of the vehicle occupant detection apparatus provided with respect to the vehicle occupant seated in the driver seat. More specifically, FIG. 1 shows, from one side of the vehicle, the vehicle occupant 11 seated in the driver seat 12. Belt (webbing) 13 of a seat belt apparatus 10 is worn around the vehicle occupant 11 seated in the driver seat 12. The seat belt apparatus 10 restrains the body of the vehicle occupant 11 to the seat 12 by means of the belt 13 worn around the occupant 11.

The belt 13 includes an upper belt portion 13a for restraining an upper body portion of the vehicle occupant 11, and a lower belt portion 13b for restraining a waist portion of the vehicle occupant 11. The lower belt portion 13b is connected at one end thereof to a vehicle body portion, located in a lower area of a vehicle compartment, by means of an anchor plate 14. The upper belt portion 13a is folded back via a through-anchor 15 provided near a shoulder of the vehicle occupant 11, and it is connected at one end thereof to a belt reel of a retractor 16. Tongue plate 17 is attached to a region of the belt 13 where the respective distal ends of the upper and lower belt portions 13a and 13b merge with each other. The tongue plate 17 is detachably attached to a buckle 18 fixed to one side of a lower seat section of the seat 12, and a buckle switch 19 for detecting connection, to the buckle 18, of the tongue plate 17 is provided on the buckle 18.

The vehicle occupant detection apparatus of the present invention is provided for detecting the vehicle occupant 11 seated in the seat 12. The vehicle occupant detection apparatus, as shown in FIG. 1, comprises an image pickup device 21 oriented toward an area including a position of the vehicle occupant 11 present within the vehicle compartment for taking images of the vehicle occupant 11 etc., and at least one light emitting element 22 for emitting auxiliary light 23 to the imaging area within the vehicle compartment. The image pickup device 21 is, for example, in the form of a CMOS camera, and preferably, two or more light emitting elements 22 are provided in the instant embodiment. The auxiliary light 23 emitted by the light emitting elements 22 is used to determine normality/abnormality of imaging information provided by the image pickup device 21. The image pickup device 21 and the light emitting elements 22 together constitute a camera unit 20.

In the vehicle occupant detection apparatus arranged in the aforementioned manner, the number of the image pickup device 21 is not limited to just one. Namely, a plurality of imaging areas or to-be-imaged objects may be set within the vehicle compartment, and the image pickup device 21 may be provided for each of the plurality of imaging areas or to-be-imaged objects. In the embodiment, the two light emitting elements 22 are provided for emitting the auxiliary light 23 to determine normality/abnormality of the imaging operation of the image pickup device 21. The light emitting elements 22 can also be used as imaging illumination light sources for imaging by the image pickup device 21, as necessary. Further, another light emitting source than the light emitting elements 22 may be provided for irradiating light (e.g., infrared light) to a to-be-imaged object at the time of normal imaging. Furthermore, the number of the image pickup device 21 is not limited to just one.

The image pickup device 21 receives light reflected off the vehicle occupant 11 that is a to-be-imaged object, and a distance between the image pickup device 21 and the to-be-imaged object (i.e., vehicle occupant 11) can be detected by subsequent image signal processing arranged to detect a phase difference between the irradiated light (e.g., infrared light) and the reflected light of the irradiated light.

FIG. 2 is a block diagram showing an example system setup of the instant embodiment of the vehicle occupant detection apparatus, in which the vehicle occupant detection apparatus is shown as including one image pickup device 21 and two light emitting elements 22. Analog image signal generated by the image pickup device 21 is supplied to an image signal processing unit 30. A/D converter 31 for converting each analog image signal into digital representation is provided at an input stage of the image signal processing unit 30. The image signal processing section 30 includes a vehicle occupant determination block 32 for performing normal image signal processing, on the assumption that the imaging operation of the image pickup device 21 is normal, to make determinations about the vehicle occupant, and an abnormality determination block 33 for determining whether an image picked up by the image pickup device 21 is normal or abnormal.

The image signal processing unit 30 includes a characteristic extraction section 34, and a vehicle occupant determination section 35. The characteristic extraction section 34 has a function for extracting, from the image signal acquired through the imaging operation of the image pickup device 21, characteristics of the image of the vehicle occupant 11 as positional information. The vehicle occupant determination section 35 determines presence/absence, head position, physical size, etc. of the vehicle occupant 11. Signal indicative of results of the above-mentioned determinations (i.e., vehicle occupant determination result signal) is generated from the vehicle occupant determination section 35. The vehicle occupant determination result signal generated from the vehicle occupant determination section 35 is output from the vehicle occupant determination block 32 by way of an ON/OFF connection section 36 that is normally kept in the ON state.

Further, in FIG. 2, the abnormality determination block 33 includes a storage section 41, a comparison section 42, an imaging abnormality determination section 43, a warning section (i.e., abnormality notifying section) 44, and a vehicle-occupant-determination invalidation section 45. The storage section 41 stores an image signal (or imaging signal), generated from the image pickup device 21, after the image signal has been converted via the A/D converter 31 into digital image data (or imaging information). The comparison section 42 compares data of the last (or first) picked-up image (hereinafter "last (or first) image data") stored in the storage section 41 and data of the subsequent, i.e. current (or second), picked-up image (hereinafter "current (or second) image data"), to thereby calculate a difference in imaging information therebetween. Further, the imaging abnormality determination section 43 compares the imaging information difference (D), provided by the comparison section 42, against a predetermined determination criterion (i.e., threshold value Dth), to thereby determine whether the imaging information is normal or abnormal.

The last image data and current image data, which both pertain to the same to-be-imaged object or vehicle occupant 11, are image data obtained by varying the light emission of the auxiliary light emitting elements 22 in two different patterns.

Once the abnormality determination section 43 outputs an abnormal imaging information signal indicating that the imaging information has been determined to be abnormal, the warning section 44 issues an alarm or warning. Further, in response to the abnormal imaging information signal from the abnormality determination section 43, the vehicle-occupant-determination invalidation section 45 performs an operation for invalidating the vehicle occupant determination result signal generated from the vehicle occupant determination section 35 of the vehicle occupant determination block 32.

The auxiliary light emission by the two auxiliary light emitting elements 22 is controlled by an auxiliary light control section 46 so as to generate a first light emitting pattern for obtaining the last image data and a second light emitting pattern for obtaining the current image data. In the first light emitting pattern, the auxiliary light emitting elements 22 are set either to a partial-illumination light emitting state (or "partial illuminating state") where the auxiliary light is emitted with one of the light emitting elements 22 (or a portion of the light emitting elements 22 in the case where three or more light emitting elements 22 are provided) turned off, or to a low-light-amount illuminating light emitting state (i.e., low-light-amount illuminating state) where one or both of the two light emitting elements 22 are reduced to a low light emitting level (i.e., luminance level). Further, in the above-mentioned second light emitting pattern, the auxiliary light emitting elements 22 are set to a full-illumination light emitting state (or "full illuminating state") where both of the two light emitting elements 22 are caused to emit light at an ordinary level (i.e., with a predetermined light amount greater than the low light amount). In the case where only one light emitting element 22 is provided, the low-light-amount illuminating state (first light emitting pattern) and the full (or ordinary-level) illuminating state (second light emitting pattern) are used.

Whereas FIG. 2 shows, in a block diagram, an example system setup of the instant embodiment of the vehicle occupant detection apparatus, the vehicle occupant determination and abnormality determination functions of the image signal processing section 30 and the auxiliary light emission function of the auxiliary light control section 46 are, in effect, implemented by software, i.e. by a computer executing a predetermined software program. With reference to a flow chart of FIG. 3, the following paragraphs describe processing or control sequences pertaining to the aforementioned functional components in the system setup.

At first step S11, the two light emitting elements 22 are set to the aforementioned first light emitting state pattern (for imaging operation either in the partial illuminating state or in the low-light-amount illuminating state), and the image pickup device 21 picks up an image of the vehicle occupant (last or first imaging). Image data of the vehicle occupant acquired through this imaging is stored into the storage section 41 as last (or first) image data, at step S12. More specifically, an imaging signal (i.e., analog image signal) generated by such imaging operation of the image pickup device 21 is converted, via the A/D converter 31, into digital image data and then stored into the storage section 41 in digital representation. For example, the above-mentioned image data is data comprising pixel-by-pixel information represented in a histogram.

At next step S13, the two light emitting elements 22 are set to the aforementioned second light emitting state pattern (for imaging operation in the full-illumination state), and the image pickup device 21 picks up an image of the vehicle occupant 11 (current or second imaging). Image data of the vehicle occupant obtained through this imaging operation is supplied, as current (or second) image data, to the comparison section 42. Then, at step S14, the comparison section 42 compares the current image data against the last image data. More specifically, by the comparison section 42, a difference D in imaging information (i.e., imaging information difference D) between the current image data and the last image data (i.e., current and last imaging information) is obtain. The thus-obtained imaging information difference D normally comprises pixel-by-pixel difference data, which is expressed in vectorial representation.

The imaging information difference D indicates a difference in imaging information between the image data of the vehicle occupant 11 acquired through the imaging operation by the image pickup device 21 in two different light emitting states, i.e. in the full-illumination light emitting state pattern with full auxiliary light and in the low-light-amount illuminating state pattern with reduced light amount.

The aforementioned imaging information difference D is compared against a threshold value (Dth) at next step S15. More specifically, a difference value per pixel in the imaging information difference D may be compared against the threshold value Dth. If the imaging information difference D is equal to or smaller than the threshold value Dth as determined at step S15, it is determined, at step S16, that the imaging information acquired through the imaging operation of the image pickup device 21 is abnormal. This is because, if the image pickup device 21 is in a normal operating condition, the two image data, acquired as a result of the imaging operation with the auxiliary light condition varied in the aforementioned manner, should present a difference D greater than the threshold value Dth; thus, in the event no difference occurs between the difference D and the threshold value Dth, it is appropriate to consider the imaging information to be abnormal.

If the difference D is greater than the threshold value Dth as determined at step S15, the imaging information is considered to be normal. Generally, in such a case, the aforementioned "abnormality determination" operation may be brought to an end. However, according to the control sequence employed in the instant embodiment, when the imaging information has been determined to be normal, a further determination is made, on the basis of the image data acquired through the current imaging operation of the image pick-up device 21 in the full-illumination light emitting state, as to determine whether luminance information C is equal to or smaller in value than a predetermined threshold value Cth at step S17 following the NO determination at step S15. If the luminance information C is equal to or smaller in value than the predetermined threshold value Cth, it is determined at step S18 that the image pick-up device 21 is currently in an abnormal operating condition. If, on the other hand, the luminance information C is greater in value than the predetermined threshold value Cth, it is determined at step S18 that the image pick-up device 21 is currently in a normal operating condition, and then the instant control sequence is brought to an end.

The operations at steps S15-S18 are performed by the aforementioned abnormality determination section 43. To perform the operations at steps S17 and S18, the abnormality determination section 43 includes a light-emitting-element abnormality determination section 43*a*.

After completion of the operation at step S16 or S18, control goes to step S19, where an abnormality informing operation is executed, as an alarming or warning operation, by the aforementioned warning section 44. Among various possible means for such warning is illumination of a warning LED.

At last step S19, an operation is performed for invalidating the results of the vehicle occupant determinations, such as presence/absence of the vehicle occupant 11, obtained through the processing of the vehicle occupant determination block 32. This vehicle occupant determination invalidation operation of step S19 is carried out by the vehicle-occupant-determination invalidation section 45. Once the vehicle-occupant-determination invalidation section 45 outputs an invalidation signal, the ON/OFF connection section 36 is placed in the OFF state so that the vehicle occupant determination result signal generated from the vehicle occupant determination section 35 is set to an OFF state so that the vehicle occupant determination result signal is prevented from being output via the vehicle occupant determination block 32.

With the system setup shown in FIG. 2 and the control flow shown in FIG. 3, a functional failure of the vehicle occupant detection apparatus can be prevented or forestalled, because the auxiliary light emission, by the light emitting elements 22, to the vehicle occupant 11 is adjusted in two different patterns to obtain two different (i.e., last and current) imaging information, the thus-obtained two imaging information is compared to acquire the difference (D) therebetween, then normality/abnormality of the imaging information is determined on the basis of the difference (D) and then the vehicle occupant determinations are invalidated if the imaging information has been determined to be abnormal. Further, because abnormality warning is issued by the warning section 44 when the imaging information has been determined to be abnormal, any functional failure of the vehicle occupant detection apparatus can be forestalled with an enhanced reliability.

It should be appreciated that various constructions, shapes, sizes, positions, etc. explained above in relation to the preferred embodiment are just for illustrative purposes, and that the present invention is not limited to the embodiment described above and may be modified variously without departing from the scope indicated by the appended claims.

The present invention can be advantageously applied to forestall a functional failure of the vehicle occupant detection apparatus.

Obviously, various minor changes and modifications of the present invention are possible in light of the above teaching. It is therefore to be understood that within the scope of the appended claims the invention may be practiced otherwise than as specifically described.

What is claimed is:

1. A vehicle occupant detection apparatus, comprising:
    an image pickup device to obtain imaging information and subsequent imaging information of a vehicle occupant within a vehicle compartment;
    a vehicle occupant determination means for making a determination about the vehicle occupant based on the imaging information and the subsequent imaging information;
    a light emitting element for emitting auxiliary light into the vehicle compartment that includes an imaging area of the image pickup device;
    a storage means for storing the imaging information provided by the image pickup device;
    a comparison means for comparing the imaging information and the subsequent imaging information provided by the image pickup device, to provide an imaging information difference between the imaging information and the subsequent imaging information; and
    an imaging abnormality determination means to determine if the image pickup device is operating properly based on the imaging information difference provided by the comparison means,
    wherein any further operation of the vehicle occupant detection apparatus is prevented if the imaging abnormality determination means determines that the image pick-up device is not operating properly.

2. The vehicle occupant detection apparatus according to claim 1, further comprising a plurality of the light emitting elements, wherein the comparison means compares the imaging information provided by the image pickup device with the light emitting element set in a partial illuminating state and the subsequent imaging information provided by the image pickup device with the light emitting element set in a full illuminating state.

3. The vehicle occupant detection apparatus according to claim 1, wherein the comparison means compares the imaging information provided by the image pickup device with at least one the light emitting element set in a low-light-amount illuminating state and the subsequent imaging information provided by the image pickup device with at least one the light emitting element set in an illuminating state with a predetermined light amount greater than the low light amount.

4. The vehicle occupant detection apparatus according to claim 1, further comprising a light-emitting-element abnormality determination means to determine if the light emitting element is operating properly based on luminance information contained in the imaging information from the image pickup device when the light emitting element set in a predetermined illuminating state.

5. The vehicle occupant detection apparatus according to claim 1, further comprising abnormality notifying means for notifying abnormality of the imaging information based on a determination signal output by the imaging abnormality determination means.

6. The vehicle occupant detection apparatus according to claim 1, further comprising invalidation means for invalidating the determination about the vehicle occupant made by the vehicle occupant determination means when it has been determined by the imaging abnormality determination means that the subsequent imaging information is abnormal.

* * * * *